United States Patent [19]
Ares

[11] 3,725,926
[45] Apr. 3, 1973

[54] FREQUENCY DIVERSIFIED RADAR SYSTEM

[75] Inventor: Manuel Ares, Manlius, N.Y.

[73] Assignee: The United States of America as represented by the Secretary of the Air Force

[22] Filed: Mar. 11, 1969

[21] Appl. No.: 808,038

[52] U.S. Cl..............343/17.5, 343/7.7, 343/17.2 R
[51] Int. Cl.................................................G01s 9/02
[58] Field of Search......................343/7.7, 17.2, 17.5

[56] References Cited

UNITED STATES PATENTS

| | | | |
|---|---|---|---|
| 3,201,789 | 8/1965 | Fine | 343/7.7 |
| 3,386,093 | 5/1968 | Mooney, Jr. et al | 343/7.7 |
| 3,427,617 | 2/1969 | Richman | 343/7.7 X |

Primary Examiner—Malcolm F. Hubler
Attorney—Harry A. Herbert, Jr. and Henry S. Miller, Jr.

[57] ABSTRACT

A frequency diversity moving target indicator radar system utilizing a combination of coherent and incoherent processing to improve performance in clutter interference, including a multiple frequency waveform which is processed in a multiple channel receiver and further including a frequency multiplexer, a broad band delay line IF canceller and a demultiplexer. Normalizers producing digital signals, and digital delays for aligning the signals in the time domain combine with a binomial detector to produce target information.

2 Claims, 3 Drawing Figures

FREQUENCY DIVERSIFIED RADAR SYSTEM

BACKGROUND OF THE INVENTION

This invention relates generally to moving target indicator radar system, and more specifically to such a system wherein improved reception is provided as a result of frequency diversity in the radar signal pulse train.

Due to the vast increase in the utilization of scanning and tracking radar systems, the inherent problems of cross signal interference and clutter have increased proportionately. It has been necessary then, to refine existing systems substantially to avoid these degrading effects in order that objects will not be lost to natural, accidental, or intentional interference. In the past, some systems have utilized coherent processing of incoming signals to negate the effects of clutter interference, while other systems have suggested the use of noncoherent signal processing.

The invention disclosed herein takes the advantages of the prior art and utilizes these teachings in a new and novel way to provide a moving target indicator radar system which is less subject to clutter and interference than any hitherto known.

SUMMARY OF THE INVENTION

The radar system of the instant invention is described particularly with regard to ground clutter, however the principles and inventive concepts are not limited thereto.

Ground clutter is characterized by a very narrow doppler spectrum and range extent of less than 50 miles. Generally the appropriate waveform in this case is a pulse train which has an interpulse period that spans the clutter or approximately 600 microseconds.

Where the radar function is considered to be one primarily of surveillance a clutter cancellation method is considered appropriate to provide 30 to 50 decibels of additional improvement in the signal to clutter ratio.

Conventional radars additionally limit the moving target indicator (MTI) performance by scanning errors created by the motion of the antenna. A phase array radar system, however, eliminates this nonlinearity and improved performance is therefore limited only by stability of the equipment, spectral width of the clutter, and nonlinearities. Additionally, with phased array radar the MTI can be of the known integrate and dump type wherein multiple cancellations are performed using one delay line.

The system advanced herein proposes the utilization of a wave form having three multiple frequency pulses separated by a constant interpulse period which is in excess of the suggested 600 microseconds. Within each pulse are a number of subpulses of different carrier frequency. While pulse-to-pulse coherence of each of the subpulses is necessary, there is no requirement of any particular phase relationship from one subpulse to another. Further, the exact manner in which these frequencies are arranged has not been found to be of critical importance. The frequencies may be varied to suit the particular equipment utilized and the other environmental and nonenvironmental conditions existing at the time.

The frequency diversified pulse train is processed in a system where the radio frequency signals containing the multiplicity of frequencies are divided, mixed, and amplified. The outputs are then frequency multiplexed and sent to a broad band canceller in the intermediate frequency stage. Additional signal processing is provided for clutter which varies with range in a post detection scheme known in the art as a constant false alarm rate system.

This additional processing involves demultiplexing the signals separating them by frequency, detecting, normalizing and realigning them in the time domain. A binomial detector analyzes the signals which provide a digital output indicative of a target when a preselected number of input pulses are present.

It is therefore an object of this invention to provide a new and improved moving target indicator radar system which is less susceptible to clutter than any hitherto known.

It is a further object of this invention to provide a new and improved frequency diversified radar system which has improved performance over conventional radars while operating in the absence of clutter.

It is still another object of this invention to provide a new and improved frequency diversified radar system which has improved performance over conventional radars while operating in the presence of clutter.

It is still a further object of this invention to provide a new and improved frequency diversified doppler radar system which eliminates blind speeds typical of single frequency systems.

It is still another object of this invention to provide a new and improved radar system wherein it is unnecessary to stagger interpulse periods to eliminate the effects of objects moving at the system's blind speed.

These and other advantages, features and objects of the invention will become more apparent from the following description taken in connection with the illustrative embodiment in the accompanying drawings, wherein:

DESCRIPTION OF THE PREFERRED EMBODIMENT

Figure 1:
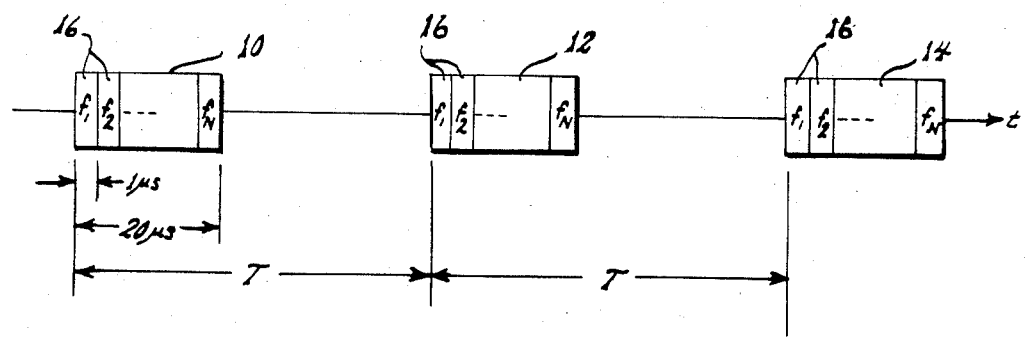
FIG. 1 is a representation of pulse spacing utilized in the invention.

Referring now to FIG. 1, a series of pulses 10, 12 and 14 are shown in representative block form. Each pulse contains a number of frequencies 16. The pulses are separated by a constant interpulse period "T" which is chosen generally to be greater than 600 microseconds in order that ground clutter may be bypassed. The pulses utilized have a 20 microsecond duration and provide for 20 different carrier frequencies each having a 1 microsecond duration. These pulses are transmitted for each beam position in which ground clutter is known in a phased array radar system.

Figure 2:
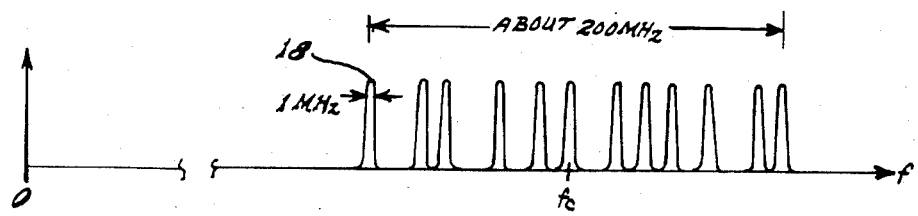
FIG. 2 is a representation of one frequency diversity wave form that could be utilized in the invention.

Concerning FIG. 2, there is shown an example of the wave form in a single pulse. A band spread of 200 Megahertz is spread over a range extending on either side of the center frequency $F_c$. The individual carrier frequencies 18 are in the order of one MHz and are arranged in a generally random grouping as can be seen from the figure.

Figure 3:
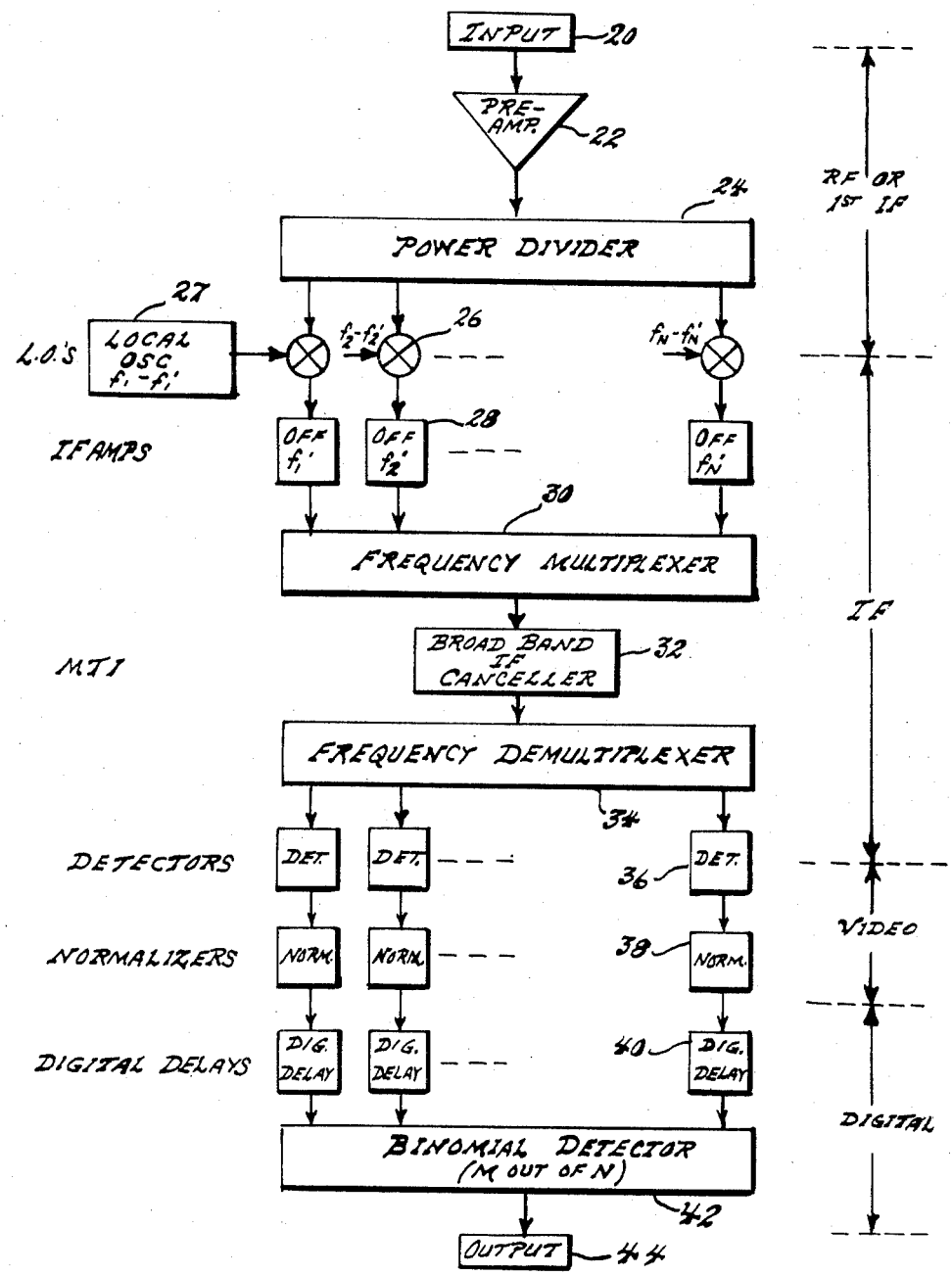
FIG. 3 is a block diagram of the system included in the invention.

In FIG. 3 the processing of the doppler radar pulses is seen in block form.

The input from the array beamformer 20 which may be at a high IF to provide image rejection is first amplified 22 and then distributed 24 to the mixers 26 which have the function with local oscillators 27 of converting the 20 frequencies spread over 200 MHz to 20 intermediate frequencies 28 spread over 25 MHz allowing a safe safety margin of 20 percent for guard bands. The resulting signals are frequency multiplexed 30 to form a single channel and applied to a broad band delay line IF canceller 32. After cancellation, the signals are demultiplexed at 34. Each of the channels is detected 36 and the resulting video signals are applied to the normalizers 38. The output of each normalizer is a DC level which indicates that the range cell being tested does or does not exceed the average. This output is sampled at a rate consistent with the bandwidth of each subpulse (1 MHz). The result is that the outputs of the 20 normalizers are 1-bit digital signals. These are now realigned in the time domain 40 and applied to a digital detector 42 which declares a target present when a preset number of input pulses are present 44.

Although the invention has been described with reference to a particular embodiment, it will be understood to those skilled in the art that the invention is capable of a variety of alternative embodiments within the spirit and scope of the appended claims.

I claim:

1. A receiver for processing input signals in a frequency diversified doppler radar system comprising: means for receiving and amplifying the input signals; means for dividing the signals into separate frequency groupings; a plurality of mixers, including local oscillators to produce intermediate frequencies connected to the dividing means; a frequency multiplexer to recombine the divided signals; means connected to the multiplexer for cancelling undesired signals; a frequency demultiplexer connected to said cancelling means for separating the said signals into frequency groupings; means to detect and normalize each of said frequency groupings, and digital detector means connected to the normalizing means for indicating the presence of a target when a preset number of input pulses are present.

2. A method of suppressing interference in radar systems including the steps of transmitting a series of multiple frequency pulses at regular intervals; receiving the echo pulses; separating the received pulses into frequency groupings; mixing and amplifying the frequency groupings to produce an intermediate frequency; recombining the frequency groupings; eliminating the undesired signals; reseparating the signals into frequency groupings; obtaining video signals based on frequency groupings; converting the video signals into digital signals and detecting the digital signals to indicate the presence of a target without regard to interference.

* * * * *